(12) United States Patent
Wang (10) Patent No.: US 12,087,099 B2
(45) Date of Patent: Sep. 10, 2024

(54) METHOD FOR ESTABLISHING COMMUNICABLE CONNECTION WITH TIRE PRESSURE MONITORING SYSTEM, APPARATUS THEREOF AND ELECTRONIC DEVICE

(71) Applicant: AUTEL INTELLIGENT TECHNOLOGY CORP., LTD., Guangdong (CN)

(72) Inventor: Tao Wang, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 1084 days.

(21) Appl. No.: 16/924,363

(22) Filed: Jul. 9, 2020

(65) Prior Publication Data

US 2020/0342690 A1   Oct. 29, 2020

Related U.S. Application Data

(63) Continuation-in-part of application No. PCT/CN2019/070753, filed on Jan. 8, 2019.

(30) Foreign Application Priority Data

Jan. 9, 2018   (CN) .......................... 201810019782.1

(51) Int. Cl.
| | | |
|---|---|---|
| G07C 5/00 | (2006.01) | |
| B60C 23/04 | (2006.01) | |
| G07C 5/08 | (2006.01) | |
| H04W 4/50 | (2018.01) | |

(52) U.S. Cl.
CPC .............. *G07C 5/008* (2013.01); *B60C 23/04* (2013.01); *G07C 5/0816* (2013.01); *H04W 4/50* (2018.02)

(58) Field of Classification Search
CPC . B60C 23/04; B60C 23/0471; B60C 23/0479; G07C 5/008; G07C 5/08;
(Continued)

(56) References Cited

U.S. PATENT DOCUMENTS

| | | | |
|---|---|---|---|
| 2012/0075664 A1* | 3/2012 | Nichols ................. | G06F 3/1204 358/1.15 |
| 2013/0038441 A1* | 2/2013 | Deniau ............... | B60C 23/0455 340/447 |
| 2017/0195470 A1 | 7/2017 | Li et al. | |

FOREIGN PATENT DOCUMENTS

| | | |
|---|---|---|
| CN | 101018236 A | 8/2007 |
| CN | 101687447 A | 3/2010 |

(Continued)

OTHER PUBLICATIONS

The First Chinese Office Action dated Nov. 19, 2021; Appln. No. 202010544681.3.

(Continued)

*Primary Examiner* — Omer S Khan
(74) *Attorney, Agent, or Firm* — Frank Gao, Esq.

(57) ABSTRACT

The present invention relates to a method for establishing a communicable connection with a tire pressure monitoring system, an apparatus thereof and an electronic device. The method includes: determining several candidate protocol configurations; loading the candidate protocol configurations one by one until at least one usable configuration is determined, the usable configuration being a protocol configuration with which a communicable connection with the tire pressure monitoring system can be established; and establishing a communicable connection with the tire pressure monitoring system based on the usable configuration. By applying the method for establishing a communicable connection with a tire pressure monitoring system, a success rate of a diagnostic device entering a tire pressure monitor- (Continued)

ing system is improved without increasing hardware device costs. Connection errors do not occur frequently, thereby providing better user experience.

6 Claims, 4 Drawing Sheets

(58) Field of Classification Search
CPC ..... G07C 5/0816; H04L 67/12; H04L 67/141; H04W 4/50
See application file for complete search history.

(56) References Cited

FOREIGN PATENT DOCUMENTS

| | | |
|---|---|---|
| CN | 102092247 A | 6/2011 |
| CN | 103503353 A | 1/2014 |
| CN | 103826879 A | 5/2014 |
| CN | 103889745 A | 6/2014 |
| CN | 107225918 A | 10/2017 |
| CN | 108566407 A | 9/2018 |
| DE | 102014110931 A1 | 2/2015 |
| TW | 201505867 A | 2/2015 |

OTHER PUBLICATIONS

The Second Chinese Office Action dated Nov. 22, 2019; Appln. No. 201810019782.1.
International Search Report Application No. PCT/CN2019/070753; Mailed Feb. 27, 2019.
Second Chinese Office Action Dated Nov. 22, 2019; Application No. 201810019782.1.

* cited by examiner

METHOD FOR ESTABLISHING COMMUNICABLE CONNECTION WITH TIRE PRESSURE MONITORING SYSTEM, APPARATUS THEREOF AND ELECTRONIC DEVICE

The present application is a continuation-in-part of International Patent Application No. PCT/CN2019/070753 filed on Jan. 8, 2019, which claims priority to Chinese Patent Application No. 201810019782.1 filed on Jan. 9, 2018, both of which are incorporated herein by reference in their entireties.

BACKGROUND

Technical Field

The present application relates to the field of vehicle diagnosis technologies, and in particular, to a method for establishing a communicable connection with a tire pressure monitoring system, an apparatus thereof and an electronic device.

Related Art

A tire pressure monitoring system is a safety guarantee system that is implemented through software and hardware devices and that is configured to, in a vehicle traveling procedure, automatically monitor tire pressure of a vehicle in real time, and issue an alarm when a tire is flat or tire pressure is insufficient, to ensure traveling safety. As people's demands for vehicle safety continuously increase, more vehicles are equipped with a tire pressure monitoring system.

For the tire pressure monitoring system, due to various possible reasons, software or hardware faults may occur, resulting in that the system cannot run normally. In this case, the tire pressure monitoring system needs to be repaired. A corresponding diagnostic device obtains, by communicating with the tire pressure monitoring system through a particular interface (such as an OBD interface) provided in the vehicle, fault information generated by the system, or repairs a system fault.

A current vehicle diagnostic device usually adopts, according to vehicle information, such as a brand, a model and a model year, of a vehicle, a protocol that has a one-to-one correspondence with the vehicle and that is uniquely determined to establish communication with a vehicle controller.

In a process of implementing the present invention, it is found that there are at least the following problems in the prior art: Because models of existing vehicles are changed and upgraded too fast, it is difficult to change correspondences of protocols timely. Therefore, when a communicable connection with a tire pressure monitoring system is established, a default manner of using one protocol in the prior art and an actual protocol correspondence of the tire pressure monitoring system are not completely accurate.

In this case, a problem that a communicable connection with a tire pressure monitoring system cannot be established because of an error occurring in a protocol correspondence is likely to occur.

SUMMARY

To resolve the foregoing problems, embodiments of the present invention provide a method for establishing a communicable connection with a tire pressure monitoring system by adaptively changing a used protocol correspondence, an apparatus thereof and an electronic device.

To resolve the foregoing technical problems, the embodiments of the present invention provide the following technical solutions:

A method for establishing a communicable connection with a tire pressure monitoring system is provided. The method includes the following steps: determining several candidate protocol configurations; loading the candidate protocol configurations one by one until at least one usable configuration is determined, the usable configuration being a protocol configuration with which a communicable connection with the tire pressure monitoring system can be established; and establishing a communicable connection with the tire pressure monitoring system based on the usable configuration.

In some embodiments, the determining several candidate protocol configurations specifically includes: calculating configurations that need to be loaded, and generating corresponding configuration signs, where a quantity of the configurations that need to be loaded is N, N being a positive integer; loading the configurations sequentially according to the N configuration signs, to obtain corresponding configuration information; and storing the configuration information as the candidate protocol configurations.

In some embodiments, the loading the configurations sequentially according to the N configuration signs, to obtain corresponding configuration information specifically includes: loading the $n^{th}$ configuration sign in the N configuration signs, where n is a positive integer and is less than N; determining whether the $n^{th}$ configuration sign is effective; if so, obtaining configuration information corresponding to the $n^{th}$ configuration sign, and stopping loading; and if not, continuing to load the $(n+1)^{th}$ configuration sign in the N configuration signs.

In some embodiments, the loading the candidate protocol configurations one by one until at least one usable configuration is determined specifically includes: loading one of the candidate protocol configurations; sending a communicable connection request to the tire pressure monitoring system based on the protocol configuration; determining that the protocol configuration is a usable configuration and stopping loading when the communicable connection can be established; and determining that the protocol configuration is an unusable configuration and continuing to load a next candidate protocol configuration when the communicable connection cannot be established.

In some embodiments, the method further includes adding data verification for the candidate protocol configurations.

In some embodiments, the loading the candidate protocol configurations one by one until at least one usable configuration is determined specifically includes:

loading one of the candidate protocol configurations; performing verification by using an algorithm corresponding to the data verification, to determine whether the loaded protocol configuration is effective/valid; if so, sending a communicable connection request to the tire pressure monitoring system based on the protocol configuration; if not, continuing to load a next candidate protocol configuration; determining that the protocol configuration is a usable configuration and stopping loading when the communicable connection can be established; and determining that the protocol configuration is an unusable configuration and continuing to load a next candidate protocol configuration when the communicable connection cannot be established.

To resolve the foregoing technical problem, the embodiments of the present invention further provide the following technical solutions:

An apparatus for establishing a communicable connection with a tire pressure monitoring system is provided. The apparatus includes:

a configuration obtaining module, configured to determine several candidate protocol configurations; a function execution module, configured to load the candidate protocol configurations one by one until at least one usable configuration is determined and establish a communicable connection with the tire pressure monitoring system based on the usable configuration, where the usable configuration is a protocol configuration with which a communicable connection with the tire pressure monitoring system can be established.

In some embodiments, the configuration obtaining module specifically includes: a calculation unit and a configuration information obtaining unit, where the calculation unit is configured to calculate configurations that need to be loaded, and generate corresponding configuration signs, where a quantity of the configurations that need to be loaded is N, N being a positive integer; and the configuration information obtaining unit is configured to load the configurations sequentially according to the N configuration signs, to obtain corresponding configuration information; and store the configuration information as the candidate protocol configurations.

In some embodiments, the configuration information obtaining unit is specifically configured to load the $n^{th}$ configuration sign in the N configuration signs, where n is a positive integer and is less than N; determine whether the $n^{th}$ configuration sign is effective; if so, obtain configuration information corresponding to the $n^{th}$ configuration sign, and stop loading; and if not, continue to load the $(n+1)^{th}$ configuration sign in the N configuration signs.

In some embodiments, the function execution module is specifically configured to: load one of the candidate protocol configurations; send a communicable connection request to the tire pressure monitoring system based on the protocol configuration; determine that the protocol configuration is a usable configuration and stop loading when the communicable connection can be established; and determine that the protocol configuration is an unusable configuration and continue to load a next candidate protocol configuration when the communicable connection cannot be established.

In some embodiments, the apparatus further includes a verification module, configured to add data verification for the candidate protocol configurations.

In some embodiment, the function execution module is specifically configured to: load one of the candidate protocol configurations; perform verification by using an algorithm corresponding to the data verification, to determine whether the loaded protocol configuration is effective; if so, send a communicable connection request to the tire pressure monitoring system based on the protocol configuration; if not, continue to load a next candidate protocol configuration; determine that the protocol configuration is a usable configuration and stop loading when the communicable connection can be established; and determine that the protocol configuration is an unusable configuration and continue to load a next candidate protocol configuration when the communicable connection cannot be established.

To resolve the foregoing technical problem, the embodiments of the present invention further provide the following technical solution:

An electronic device is provided. The electronic device includes at least one processor and a memory communicably connected to the at least one processor, where the memory stores an instruction program executable by the at least one processor, the instruction program being executed by the at least one processor, to enable the at least one processor to perform the foregoing method for establishing a communicable connection with a tire pressure monitoring system.

Compared with the prior art, in the method for establishing a communicable connection with a tire pressure monitoring system in the embodiments of the present invention, a manner of trying to establish a communicable connection by using several candidate protocol configurations one by one is adopted, thereby reducing a possibility that during establishment of a communicable connection, the communicable connection with the tire pressure monitoring system cannot be established, and the system is entered for diagnosis and maintenance because of a mismatch of a protocol configuration. The method may improve a success rate of establishing a communicable connection with a tire pressure monitoring system without increasing hardware device costs. Connection errors do not occur frequently, thereby providing better user experience.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present invention, the present invention is described below in further detail with reference to the accompanying drawings and specific embodiments. It should be noted that an element described as being "fixed" to another element may be directly on the other element, or one or more intervening components may be present. An element described as being "connected" to another element may be directly connected to the other element, or one or more intervening components may be present. As used in the specification, orientation or position relationships indicated by the terms such as "upper", "lower", "inside", "outside" and "bottom" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of the present invention. In addition, the terms such as "first", "second", and "third" are used only for the purpose of description, and should not be understood as indicating or implying relative importance.

Unless otherwise defined, all technical and scientific terms used herein have the same meaning as commonly understood by a person of ordinary skill in the art to which the present invention belongs. In this specification, the terms used in the specification of the present invention are merely used for describing specific embodiments, and are not intended to limit the present invention. As used herein, the term "and/or" includes any and all combinations of one or more related items listed.

In addition, the technical features provided in different embodiments of the present invention to be described below may be combined with each other as long as no conflict occurs.

Figure 1:
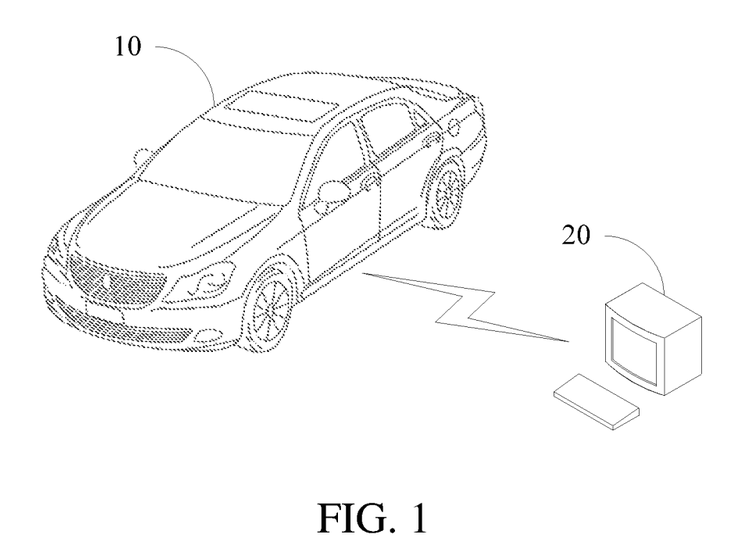
FIG. 1 is a schematic diagram of an application environment according to an embodiment of the present invention.

FIG. 1 shows an application environment according to an embodiment of the present invention. As shown in FIG. 1, the application environment includes a vehicle 10 and a diagnostic device 20.

The vehicle 10 is a vehicle equipped with a tire pressure monitoring system, and specifically, may be any type of motor vehicles, such as a truck or a sedan. Commonly, the vehicle 10 includes a plurality of tires (for example, four or six tires). Pressure statuses of the vehicle tires are monitored by the tire pressure monitoring system in real time, and a corresponding alarm signal is issued when there is an abnormal status (for example, low pressure or a tire blowout). The vehicle 10 includes at least one hardware communications interface (for example, an OBD interface), which is configured to provide a corresponding hardware interface for establishing a communicable connection with an external device.

The diagnostic device 20 is a data information reading device adopted in a procedure of vehicle fault maintenance or inspection. The diagnostic device 20 may establish communication with the vehicle 10 through the communications interface provided by the vehicle 10, to obtain related data information of the vehicle 10. In a use process, aside from establishing a hardware connection with the vehicle 10, the diagnostic device 20 further needs to load a suitable or matching protocol configuration, to correctly enter a corresponding function system of the vehicle and read data.

In this embodiment, the diagnostic device 20 enters the tire pressure monitoring system of the vehicle 10 only after loading a protocol configuration corresponding to the vehicle 10, to obtain fault information generated by the system or reset the system, repair a system fault, and so on. Applying the method for establishing a communicable connection with a tire pressure monitoring system provided by this embodiment of the present invention makes it easier for the diagnostic device 20 to load a protocol configuration corresponding to the tire pressure monitoring system and establish a communicable connection with the tire pressure monitoring system.

In an embodiment, the diagnostic device 20 is a tire pressure monitoring system (TPMS) tool which is portable by a technician. For example, the diagnostic device 20 is a tool manufactured by Autel which is the assignee of the patent application. The tool communicates with a controller of the tire monitoring system via an OBD connector of a vehicle, where the controller is installed within the vehicle. In another embodiment, the diagnostic device 20 is one of a personal computer, a tablet, and a mobile phone.

Figure 2:
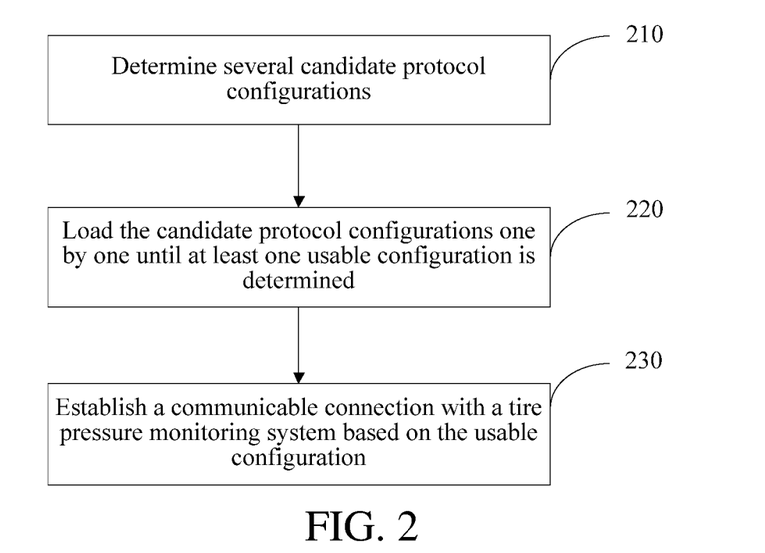
FIG. 2 is a flowchart of a method for establishing a communicable connection with a tire pressure monitoring system according to an embodiment of the present invention.

FIG. 2 shows a method for establishing a communicable connection with a tire pressure monitoring system according to an embodiment of the present invention. As shown in FIG. 2, the method may include the following steps.

210. Determine several candidate protocol configurations.

The candidate protocol configurations are protocol configurations that are determined according to an actual situation or requirement and that may be used. There may be any quantities of the candidate protocol configurations, for example, five or ten. The quantity specifically depends on filtering criteria, such as a model of the vehicle 10, set by a technician.

When relatively strict filtering criteria are set, the quantity of the candidate protocol configurations is relatively small, which helps reduce a quantity of attempts of the diagnostic device. However, when relatively loose filtering criteria are, the quantity of the candidate protocol configurations is relatively large, so that a coverage scope can be enlarged, and a possibility that the diagnostic device 20 cannot establish communication with the tire pressure monitoring system is reduced. Therefore, based on different actual requirements, suitable filtering criteria may be adjusted and adopted, to obtain a suitable quantity of protocol configurations.

220. Load the candidate protocol configurations one by one until at least one usable configuration is determined.

In this embodiment, the usable configuration is a protocol configuration with which a communicable connection with the tire pressure monitoring system can be established. The one-by-one loading means that the diagnostic device 20 loads one protocol configuration each time, and then searches for a usable configuration through a manner of performing determining.

Several candidate protocol configurations may form a configuration set, and a protocol configuration may be selected from the configuration set in any suitable manner for a try. For example, the candidate protocol configurations may be numbered and ranked randomly, and then are tried sequentially according to ranking numbers. Alternatively, a manner of random selection in the set may be adopted, to select a corresponding protocol configuration for a try. In some embodiments, a corresponding selection policy may be adopted according to actual requirements, to improve a speed of determining a usable configuration.

230. Establish a communicable connection with the tire pressure monitoring system based on the usable configuration.

After the usable configuration is determined, the diagnostic device 20 may establish communication with the tire pressure monitoring system of the vehicle quickly by using the usable configuration, to perform a corresponding diagnosis operation on the tire pressure monitoring system. In this embodiment, the diagnosis operation includes any suitable type of operation for the tire pressure monitoring system of the vehicle, for example, obtaining information to troubleshoot a fault cause, repairing a system fault or resetting one or more function modules.

Through the method for establishing a communicable connection with a tire pressure monitoring system according to an embodiment of the present invention, the diagnostic device 20 no longer adopts a one-to-one protocol correspondence, and instead, adopts a manner of scanning possible protocol configurations one by one, to find a usable configuration with which communication can be established. Such a configuration loading manner may greatly reduce a possibility of a connection error between the diagnostic device 20 and the tire pressure monitoring system of the vehicle, which enables the diagnostic device 20 to establish a communicable connection with the tire pressure monitoring system smoothly. In addition, product costs of the diagnostic device 20 do not need to be increased for such a change, leading to a better application prospect.

An application of the foregoing method for establishing a communicable connection with a tire pressure monitoring system to an actual diagnostic device is described in detail with reference to a specific embodiment. For a specific diagnostic device 20, in daily usage, a user connects the diagnostic device 20 with the vehicle 10 through the OBD interface disposed in the vehicle 10. The user may enter corresponding model information (including a brand, a model year and a model) to the diagnostic device 20 according to indication information.

In this case, the diagnostic device 20 may actively load all protocol configurations of the brand as the candidate protocol configurations. Then, in a manner of trying to establish communication by performing scanning and one-by-one loading, a usable configuration in the configurations is found or determined and is loaded, for communication with the tire pressure monitoring system, and implementing a corresponding diagnosis operation.

Compared with a commonly adopted manner of one-to-one determining a protocol, a problem that the protocol correspondence is incorrect, resulting in a failure of entering the tire pressure monitoring system, is less likely to occur on the diagnostic device 20, thereby greatly improving user experience.

In some embodiments, the candidate protocol configurations may be determined through the following methods:

First, configurations that need to be loaded are calculated, and corresponding configuration signs are generated. In this embodiment, it is assumed that a quantity of the configurations that need to be loaded is N, N being a positive integer. The configuration signs are unique marks used to distinguish the configurations, for example, configuring specific names, codes, or the like. The diagnostic device 20 is configured to determine a specific configuration according to the configuration signs.

Then, the configurations are loaded sequentially according to the N configuration signs, to obtain corresponding configuration information; and the configuration information is stored as the candidate protocol configurations.

After determining, through filtering, the configuration signs that need to be used, the diagnostic device 20 sequentially loads or obtains configuration information corresponding to the configuration signs as the candidate protocol configurations, which are provided for use in subsequent steps.

The configuration information is content of a configuration. In this embodiment, the protocol configuration is a complete communication protocol including configuration information such as a specified data format. Only when using a correct protocol configuration matching the tire pressure monitoring system, the diagnostic device 20 can correctly read data and obtain data information, to complete a diagnosis operation.

Figure 3:
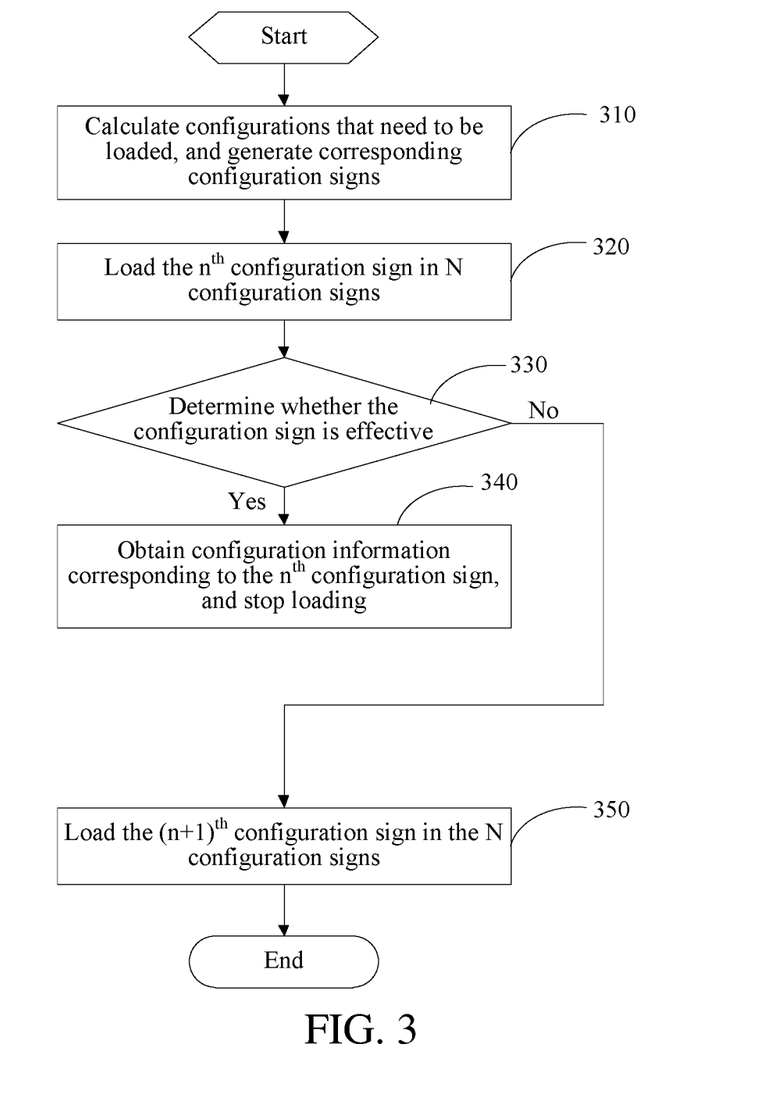
FIG. 3 is a flowchart of a method of determining candidate protocol configurations according to an embodiment of the present invention.

FIG. 3 is a flowchart of a method of determining candidate protocol configurations according to an embodiment of the present invention. As shown in FIG. 3, the method specifically includes the following steps.

310. Calculate configurations that need to be loaded, and generate corresponding configuration signs.

320. Load the $n^{th}$ configuration sign in the N configuration signs, n being a positive integer and is less than N, which means n is not more than N.

The $n^{th}$ configuration sign is one of all the N configuration signs. In some embodiments, 1 may be selected as n, and selection may be started from a first configuration sign.

330. Determine whether the $n^{th}$ configuration sign is effective. If so, step 340 is performed, and if not, step 350 is performed.

In this embodiment, before configuration information corresponding to the configuration sign is obtained, effectiveness of the configuration sign may be first determined. When a configuration sign is ineffective, the configuration sign may be directly skipped, to avoid an error. That a configuration sign is ineffective indicates a situation in which corresponding configuration information cannot be obtained according to the configuration sign, indicating that a configuration represented by the configuration sign cannot be loaded by the diagnostic device 20 for use in a current environment. The situation may specifically be that the configuration sign expires or is illegal.

340. Obtain configuration information corresponding to the $n^{th}$ configuration sign, and stop loading. After the configuration information is obtained, the diagnostic device continues to perform step 350, to determine whether it needs to continue to load a new configuration sign. The configuration information may be recorded as one of the candidate protocol configurations, to continue to determine whether the configuration information is a usable configuration in the next step.

350. Load the $(n+1)^{th}$ configuration sign in the N configuration signs.

Through the foregoing sequential determining manner, all configuration signs determined by the diagnostic device need to be determined and loaded, to obtain corresponding configuration information, and determine final candidate protocol configurations.

After several candidate protocol configurations are determined, the candidate protocol configurations may be filtered in a manner of trying them one by one until one usable configuration is obtained. The diagnostic device 20 enters the tire pressure monitoring system of the vehicle 10 by using the usable configuration, to complete a diagnosis or fault repairing task.

In some embodiments, the method of determining a usable configuration may specifically include the following steps: first, loading one of the candidate protocol configurations; and then, sending a communicable connection request to the tire pressure monitoring system based on the protocol configuration.

It is determined that the protocol configuration is a usable configuration, and loading is stopped when the diagnostic device can establish the communicable connection. The diagnostic device may stop scanning the candidate protocol configurations, and obtain, by using the usable configuration, related information (such as a fault code) of the tire pressure monitoring system. However, when the communicable connection cannot be established, it is determined that the protocol configuration is an unusable configuration, and the diagnostic device 20 continues to load a next candidate protocol configuration until one usable configuration is found.

In some other embodiments, to ensure accuracy of the obtained configuration information, data verification may be added for the candidate protocol configurations.

For example, when the configuration information is stored, preset data verification is added for each piece of the configuration information. Then, in a loading procedure, verification is performed according to a corresponding algorithm, to determine whether the obtained configuration information is valid. Specifically, the data verification may be verification in any suitable format, for example, CRC32 or another similar verification manner.

Figure 4:
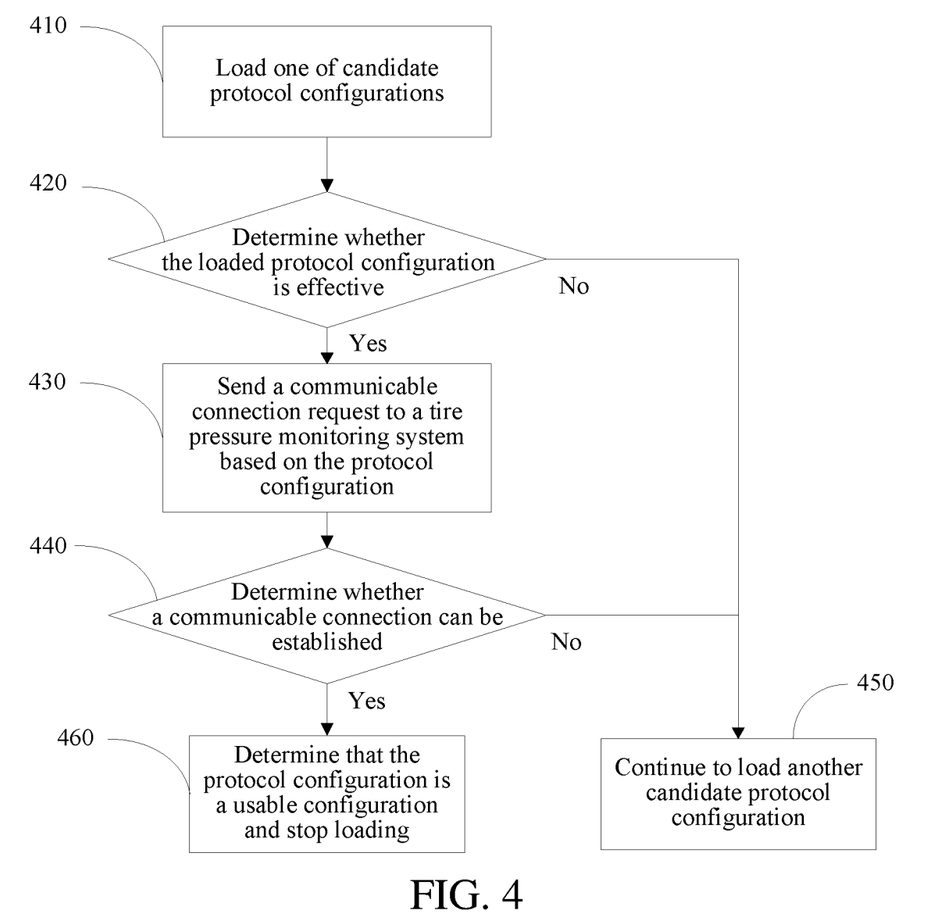
FIG. 4 is a flowchart of a method of determining a usable configuration according to an embodiment of the present invention.

FIG. 4 is a flowchart of a method of determining a usable configuration in a method according to an embodiment of the present invention. As shown in FIG. 4, the method specifically includes the following steps.

410. Load one of the candidate protocol configurations.

420. Perform verification by using an algorithm corresponding to the data verification, to determine whether the loaded protocol configuration is effective. If so, step 430 is performed; or if not, step 450 is performed.

In this embodiment, the loaded protocol configuration is first verified, to determine whether the loaded protocol configuration is consistent with stored configuration information. A next candidate protocol configuration is directly tried when the loaded protocol configuration is not consistent with the stored configuration information, the configuration information loaded this time being discarded.

430. Send a communicable connection request to the tire pressure monitoring system based on the protocol configuration.

440. Determine whether the communicable connection can be established. If yes, step 460 is performed; and if not, step 450 is performed.

450. Continue to load a next candidate protocol configuration.

When a candidate protocol configuration cannot be adopted for establishing communication, another try is made to determine whether another candidate protocol configuration can be adopted for establishing communication and entering the system until all the candidate protocol configurations are loaded and tried.

Certainly, it is possible that a usable configuration still cannot be obtained after all the candidate protocol configurations are tried. In this case, the diagnostic device 20 may pop-up corresponding prompt information, and display information to a user, for example, an information matching error or that the tire pressure monitoring system cannot be entered.

460. Determine that the protocol configuration is a usable configuration and stop loading. After finding one usable configuration, the diagnostic device 20 stops a connection attempt, directly uses the usable configuration, and completes a corresponding diagnosis or fault repairing task.

In this embodiment, when attempting to establish a connection with the tire pressure monitoring system, the diagnostic device first sets some screening criteria or the like according to actual requirements and determines a quantity of needed configurations and corresponding configuration signs. Then, the diagnostic device performs verification the configuration signs one by one, obtains and stores corresponding configuration information, and determines the candidate protocol configurations.

At last, the candidate protocol configurations are loaded one by one in a scanning manner, a suitable usable configuration is found in a manner of verifying effectiveness and testing whether communication can be established with the tire pressure monitoring system, and an operation, such as reading fault information of the tire pressure monitoring system, is completed based on the usable configuration.

Compared with a conventional one-to-one protocol correspondence manner, a success rate of entering, by the diagnostic device, the tire pressure monitoring system is effectively improved, thereby avoiding a problem that because a model of a vehicle changes fast, a protocol correspondence cannot keep up the change timely. A diagnostic device to which the method for establishing a communicable connection with a tire pressure monitoring system provided in this embodiment of the present invention is applied provides better user experience.

Figure 5:
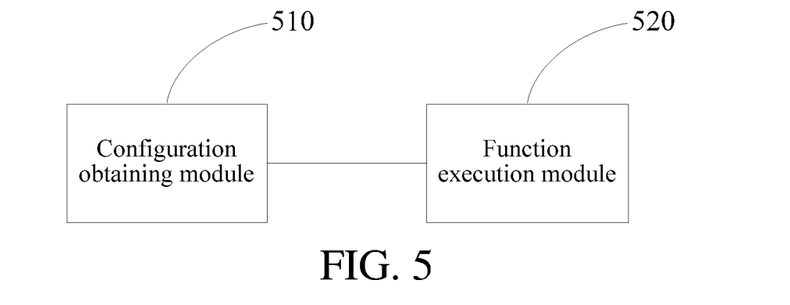
FIG. 5 is a functional block diagram of an apparatus for establishing a communicable connection with a tire pressure monitoring system according to an embodiment of the present invention.

An embodiment of the present invention further provides an apparatus for establishing a communicable connection with a tire pressure monitoring system. FIG. 5 is a functional block diagram of an apparatus according to an embodiment of the present invention. As shown in FIG. 5, the apparatus includes: a configuration obtaining module 510 and a function execution module 520.

The configuration obtaining module 510 is configured to determine several candidate protocol configurations. The function execution module 520 is configured to load the candidate protocol configurations one by one until at least one usable configuration is determined and establish a communicable connection with the tire pressure monitoring system based on the usable configuration. The usable configuration is a protocol configuration with which a communicable connection with the tire pressure monitoring system can be established.

Certainly, it is possible that the function execution module 520 still cannot find a usable configuration after all the candidate protocol configurations are tried. In this case, a diagnosis operation is directly ended, and corresponding prompt information is displayed, for example, that communication cannot be established, or a system connection error.

In some embodiments, to add a guarantee of obtaining data, and ensure that the obtained or loaded configuration information is effective, the diagnostic apparatus may further include a verification module. The verification module may be configured to add data verification for the candidate protocol configurations. Certainly, data verification may be specifically performed by using any suitable algorithm.

Figure 6:
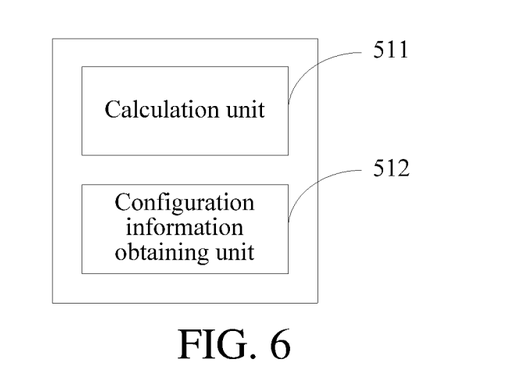
FIG. 6 is a functional block diagram of a configuration obtaining module shown in FIG. 5 according to an embodiment of the present invention.

In another embodiment, as shown in FIG. 6, the configuration obtaining module 510 includes a calculation unit 511 and a configuration information obtaining unit 512.

The calculation unit 511 is configured to calculate configurations that need to be loaded, and generate corresponding configuration signs, where a quantity of the configurations that need to be loaded is N, N being a positive integer. The configuration information obtaining unit 512 is configured to load the configurations sequentially according to the N configuration signs, to obtain corresponding configuration information; and store the configuration information as the candidate protocol configurations.

Specifically, the configuration information obtaining unit 512 is specifically configured to load the $n^{th}$ configuration sign in the N configuration signs; determine whether the $n^{th}$ configuration sign is effective; if so, obtain configuration information corresponding to the $n^{th}$ configuration sign, and stop loading; and if not, load the $(n+1)^{th}$ configuration sign in the N configuration signs.

Correspondingly, when there is data verification, the function execution module 520 is specifically configured to: load one of the candidate protocol configurations; perform verification by using an algorithm corresponding to the data verification, to determine whether the loaded protocol configuration is effective; if so, send a communicable connection request to the tire pressure monitoring system based on the protocol configuration; if not, continue to load another candidate protocol configuration; determine that the protocol configuration is a usable configuration and stop loading when the communicable connection can be established; and continue to load a next candidate protocol configuration when the communicable connection cannot be established.

Figure 7:
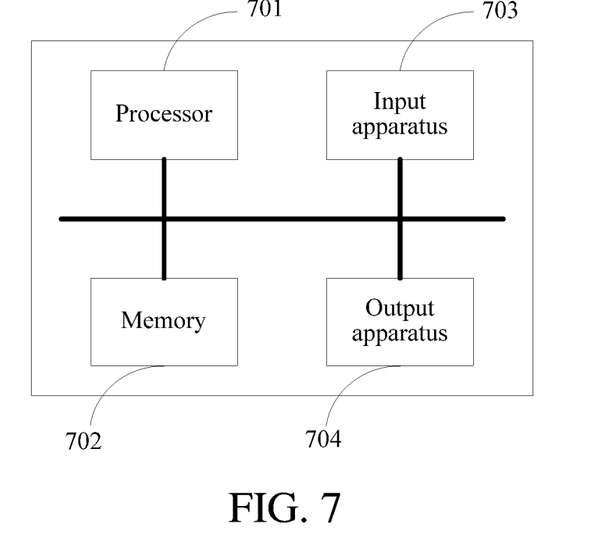
FIG. 7 is a structural block diagram of an electronic device according to an embodiment of the present invention.

FIG. 7 is a structural block diagram of an electronic device according to an embodiment of the present invention. As shown in FIG. 7, a device 70 includes one or more processors 701 and a memory 702. In FIG. 7, one processor 701 is used as an example.

The electronic device performing the foregoing method for establishing a communicable connection with a tire pressure monitoring system may further includes an input apparatus 703 and an output apparatus 704. Certainly, another suitable apparatus or module may be added or omitted according to an actual requirement.

The processor 701, the memory 702, the input apparatus 703 and the output apparatus 704 may be connected by using a bus or in another manner. A connection through a bus is used as an example in FIG. 7.

As a non-volatile computer-readable storage medium, the memory 702 may be configured to store a non-volatile software program, a non-volatile computer executable program and a module, for example, a program instruction or a module that corresponds to the method for establishing a communicable connection with a tire pressure monitoring system in embodiments of the present invention, for example, the configuration obtaining module 510 and the function execution module 520 in FIG. 5. The processor 701 runs the non-volatile software program, instruction and module stored in the memory 702, to implement various functional applications and data processing of a server, that is, to implement the foregoing method for establishing a communicable connection with a tire pressure monitoring system in the foregoing embodiments.

The memory 702 may include a program storage area and a data storage area. The program storage area may store an operating system and an application program required by at least one function. The data storage area may store data created according to use of the apparatus for establishing a communicable connection with a tire pressure monitoring system and the like. In addition, the memory 702 may include a high-speed random access memory, and may further include a non-volatile memory such as at least one magnetic disk storage device, a flash memory, or another non-volatile solid-state storage device. In some embodiments, the memory 702 may optionally include a memory remotely disposed relative to the processor 701. Instances of the network include, but are not limited to, the Internet, an intranet, a local area network, a mobile communications network, and a combination thereof.

The input unit 703 may receive input digit or character information, and generate a key signal input related to user settings and function control of the apparatus for establishing a communicable connection with a tire pressure monitoring system. In an embodiment, the input unit 703 includes one or more buttons. In some other embodiments, the input unit 703 includes a touchscreen. In some embodiments, the input unit 703 can be an optical reader, such as a code scanner. The output apparatus 704 may include a display device such as a display screen. When the input unit 703 is a touchscreen, the touchscreen can also be used as the output unit 704. The one or more modules are stored in the memory 702, and perform, when executed by the one or more processors 701, the diagnosis method in any of the foregoing embodiments.

A person skilled in the art may further be aware of that, with reference to steps of the burning method of the software code described in the embodiments disclosed in this specification, the present application may be implemented by using electronic hardware, computer software, or a combination thereof. To clearly describe interchangeability between the hardware and the software, compositions and steps of each example have been generally described according to functions in the foregoing descriptions. Whether the functions are executed in a mode of hardware or software depends on particular applications and design constraint conditions of the technical solutions.

A person skilled in the art can use different methods to implement the described functions for each particular application, but it should not be considered that the implementation goes beyond the scope of the embodiments of the present disclosure. The computer software may be stored in a computer-readable storage medium. When executed, the program may include a procedure of each of the foregoing method embodiments. The storage medium may be a magnetic disk, an optical disc, a read-only memory, a random access memory (RAM), or the like.

It should be finally noted that the above embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, a person of ordinary skill in the art should understand that they can still make modifications to the technical solutions described in the foregoing embodiments or make equivalent substitutions to some technical features thereof, without essentially departing from scope of the technical solutions of the embodiments of the present invention.

What is claimed is:

1. A method for establishing a communicable connection with a tire pressure monitoring system, applied to a diagnostic device, comprising:
    loading the candidate protocol configurations one by one until at least one usable configuration is determined, the candidate protocol configurations are predetermined, the usable configuration being a protocol configuration with which a communicable connection with the tire pressure monitoring system can be established; and
    establishing a communicable connection with the tire pressure monitoring system based on the usable configuration;
    further comprising:
        adding data verification for the candidate protocol configurations;
        wherein the loading the candidate protocol configurations one by one until at least one usable configuration is determined specifically comprises:
            loading one of the candidate protocol configurations;
            performing verification by using an algorithm corresponding to the data verification, to determine whether the loaded protocol configuration is effective;

if so, sending a communicable connection request to the tire pressure monitoring system based on the protocol configuration;

if not, continuing to load a next candidate protocol configuration;

determining that the protocol configuration is a usable configuration and stopping loading when the communicable connection is established;

obtaining information related to the tire pressure monitoring system using the usable configuration; and determining that the protocol configuration is an unusable configuration and continuing to load a next candidate protocol configuration when the communicable connection is not established.

2. The method according to claim 1, wherein the determining several candidate protocol configurations specifically comprises:

calculating configurations that need to be loaded, and generating corresponding configuration signs, wherein a quantity of the configurations that need to be loaded is N, N being a positive integer;

loading the configurations sequentially according to the N configuration signs, to obtain corresponding configuration information; and storing the configuration information as the candidate protocol configurations.

3. The method according to claim 2, wherein the loading the configurations sequentially according to the N configuration signs, to obtain corresponding configuration information specifically comprises:

loading the $n^{th}$ configuration sign in the N configuration signs, wherein n is a positive integer and is less than N;

determining whether the $n^{th}$ configuration sign is effective, wherein a configuration sign is effective indicates a situation in which corresponding configuration information can be obtained according to the configuration sign;

if so, obtaining configuration information corresponding to the $n^{th}$ configuration sign; and if not, continuing to load the $(n+1)^{th}$ configuration sign in the N configuration signs.

4. A diagnostic device for establishing a communicable connection with a tire pressure monitoring system, comprising:

a memory configured to store computer executable program;

at least one processor coupled to the memory and configured to execute the computer executable program; and a display coupled to the processor;

wherein upon execution of the computer executable program, the processor is configured to:

determine several candidate protocol configurations; and load the candidate protocol configurations one by one until at least one usable configuration is determined and establish a communicable connection with the tire pressure monitoring system based on the usable configuration; the candidate protocol configurations are predetermined;

wherein the usable configuration is a protocol configuration with which a communicable connection with the tire pressure monitoring system can be established;

wherein the processor is further configured to add data verification for the candidate protocol configurations;

wherein the processor is configured to:

load one of the candidate protocol configurations;

perform verification by using an algorithm corresponding to the data verification, to determine whether the loaded protocol configuration is effective;

if so, send a communicable connection request to the tire pressure monitoring system based on the protocol configuration;

if not, continue to load a next candidate protocol configuration;

determine that the protocol configuration is a usable configuration and stop loading when the communicable connection can be established;

obtain information related to the tire pressure monitoring system using the usable configuration; and determine that the protocol configuration is an unusable configuration and continue to load a next candidate protocol configuration when the communicable connection cannot be established.

5. The diagnostic device according to claim 4, wherein the processor is configured to:

calculate configurations that need to be loaded, and generate corresponding configuration signs, wherein a quantity of the configurations that need to be loaded is N, N being a positive integer; and load the configurations sequentially according to the N configuration signs, to obtain corresponding configuration information; and store the configuration information as the candidate protocol configurations.

6. The diagnostic device according to claim 5, wherein the processor is configured to:

load the $n^{th}$ configuration sign in the N configuration signs, wherein n is a positive integer and is less than N;

determine whether the $n^{th}$ configuration sign is effective, wherein a configuration sign is effective indicates a situation in which corresponding configuration information can be obtained according to the configuration sign;

if so, obtain configuration information corresponding to the $n^{th}$ configuration sign, and stop loading; and if not, continue to load the $(n+1)^{th}$ configuration sign in the N configuration signs.

* * * * *